MONEUSE & DUPARQUET.
Coffee Pot.
No. 92,987.  Patented July 27, 1869.
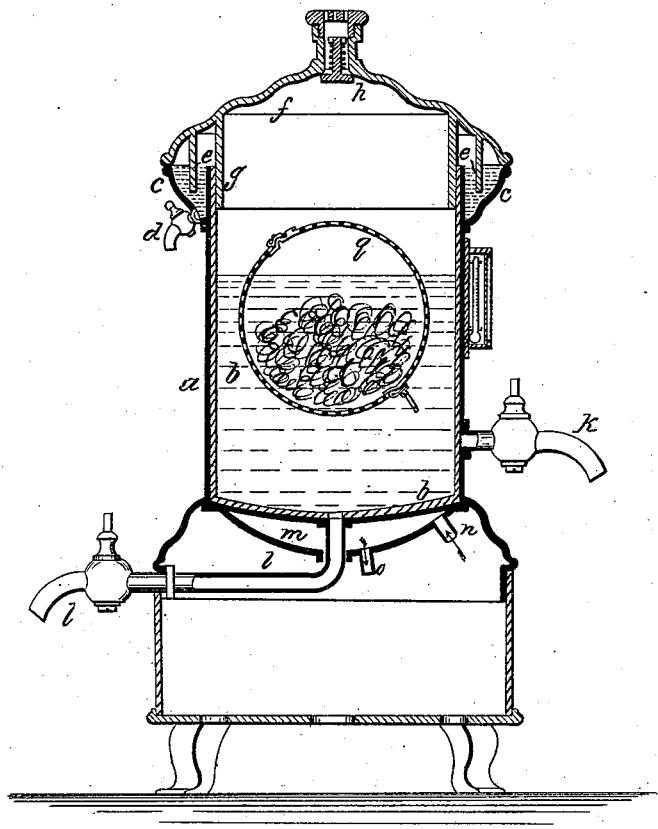
Witnesses:
Chas H Smith.
Geo. D. Walker.
Elie Moneuse
Louis Duparquet

United States Patent Office.

ELIE MONEUSE AND LOUIS DUPARQUET, OF NEW YORK, N. Y.

Letters Patent No. 92,987, dated July 27, 1869.

COFFEE-POT.

The Schedule referred to in these Letters Patent and making part of the same.

*To all whom it may concern:*

Be it known that we, ELIE MONEUSE and LOUIS DUPARQUET, of the city and State of New York, have invented and made a new and useful Improvement in Urns for Extracting Coffee or Tea; and we do hereby declare the following to be a full, clear, and exact description of the said invention, reference being had to the annexed drawing, making part of this specification, wherein we have represented a vertical section of the said invention.

In the coffee-pots or urns heretofore made, a difficulty is experienced in coating the inside of the copper vessel with sufficient thickness of melted tin to prevent the same being rapidly worn off in using or cleaning said vessel, and thereby the copper is left exposed.

To obviate this difficulty, we make use of a copper vessel $a$, with a lining made of block-tin rolled out into sheets, and fitted accurately into the inside of the copper vessel, as shown at $b$, and the two united at the joints with solder. This lining is much more perfect and durable than any lining heretofore employed in coffee-urns.

In other characters of coffee-urns, the cover has been set inside the urn with the rim in a water-vessel. In this case, the condensation of the vapors and aroma of the coffee is lost by running into this water-vessel, and being thrown away with the dirty water there accumulating.

To obviate this last-named difficulty, we place an annular water-vessel, $c$, around outside the upper end of the urn, with a cock at $d$, to allow the water to be drawn off, for replenishing, or otherwise.

This water-ring receives the flange $e$ of the cover $f$, and a second flange, $g$, from said cover $f$, sits within the urn $a$, so that all the aroma and vapors from the coffee are retained, and condense on the inside of $f$, and flange $g$, and run back into the coffee.

A valve is applied at $h$ to the cover $f$, to allow air to pass in as the coffee is drawn.

$k$ is a cock, from which good coffee is to be drawn, and $l$ is a pipe and cock, coming in at the lowest part of the urn, to take away the thicker coffee or sediment.

The bottom of the urn is made double, as at $m$, to form a steam-space, into which the pipe $n$ supplies steam, and $o$ is the pipe for condensation. A lamp or gas might, however, take the place of the steam and false bottom.

A thermometer or heat-gauge is to be applied to the urn to indicate the temperature, so that the attendant can regulate the same, and prevent the coffee getting too hot or too cold.

It has been usual heretofore to place the ground coffee in a bag, or stationary strainer. This is frequently left above the coffee in the urn, and ceases to be useful. The strainer is difficult to clean out, and the pouring of boiling water through the coffee in the strainer involves considerable loss of the aroma while the cover is off.

To remove these difficulties, we employ a perforated metallic globular coffee-holder, $q$, formed of two half shells, hinged or clasped together, so that the coffee is first placed in this holder and the shells shut together, the boiling water is supplied into the urn, and then the coffee and holder are dropped into the hot water and the cover put on. Thereby the aroma is retained, and the coffee always remains in the liquid, and its properties are fully extracted.

What we claim, and desire to secure by Letters Patent, is—

1. The cover $f$, with the flange sitting down inside the cylinder of the urn, in combination with the flange $e$ and water-ring $c$, as and for the purposes set forth.

2. The urn for coffee or tea formed of sheet-copper, with a lining of sheet-tin fitted and attached to the inside of the copper vessel, as and for the purpose set forth.

In witness whereof, we have hereunto set our signatures, this 20th day of March, A. D. 1869.

ELIE MONEUSE.
LOUIS DUPARQUET.

Witnesses:
CHAS. H. SMITH,
GEO. D. WALKER.